Figure 1:
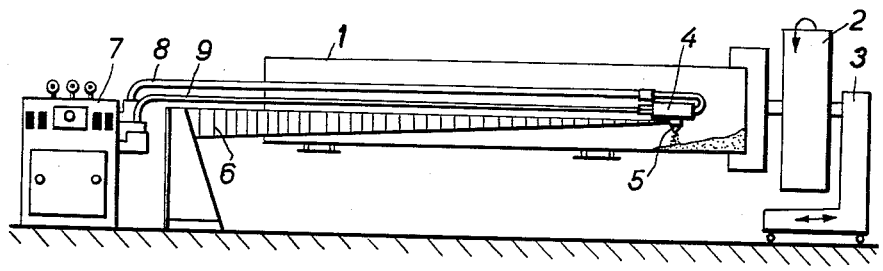

Sept. 11, 1962 P. HOPPE ET AL 3,052,927
METHOD OF CENTRIFUGALLY MOLDING CELLULAR PLASTICS
Filed Aug. 12, 1957 2 Sheets-Sheet 1

INVENTORS:
PETER HOPPE, HANS-WILLI PAFFRATH, ERWIN WEINBRENNER, KARL BREER.
BY
ATTORNEY

United States Patent Office 3,052,927
Patented Sept. 11, 1962

3,052,927
A METHOD OF CENTRIFUGALLY MOLDING CELLULAR PLASTICS
Peter Hoppe, Troisdorf, Hans-Willi Paffrath, Koln-Deutz, Erwin Weinbrenner, Leverkusen, and Karl Breer, Koln-Flittard, Germany, assignors, by direct and mesne assignments, of one-half to Farbenfabriken Bayer Aktiengesellschaft, Leverkusen, Germany, a corporation of Germany, and of one-half to Mobay Chemical Company, Pittsburgh, Pa., a corporation of Delaware
Filed Aug. 12, 1957, Ser. No. 677,635
Claims priority, application Germany Aug. 31, 1956
7 Claims. (Cl. 18—59)

This invention relates generally to a method of shaping cellular plastics and, more particularly, to a method of shaping cellular polyurethane plastics as they are formed from a foamable liquid composition.

Cellular plastics are usually formed by reacting two or more chemical compounds together which solidify upon chemical reaction. The cellular structure is obtained either by introducing a gas into the reaction mass before solidification or by a gas resulting from the chemical reaction of the components. A cellular polyurethane plastic is formed by mixing an organic compound having at least two reactive hydrogen atoms, such as, for example, a polyester or a polyalkylene ether glycol with an organic polyisocyanate and water. As the polyurethane is formed, carbon dioxide is also produced and is trapped in the thick reaction mass where it remains until solidification. The entrapped gas forms cells in the resulting solidified polyurethane plastic.

The components of a cellular polyurethane plastic must be mixed together substantially instantaneously and one of the more suitable devices heretofore disclosed for mixing these components together is disclosed in U.S. 2,764,565 granted to Hoppe et al. on September 25, 1956. In accordance with the process and apparatus disclosed in this patent, the components are rapidly mixed together by injecting under pressure the less viscous organic polyisocyanate and water along with a suitable catalyst into the more viscous organic compound having at least two reactive hydrogen atoms. The resulting mixture is expelled or discharged from the mixing apparatus through a suitable opening into a suitable mold or other shaping device before any substantial amount of chemical reaction and solidification of the reaction mass.

It is an object of this invention to provide an improved process of shaping a cellular plastic reaction mass during chemical reaction and before solidification. Another object of the invention is to provide a method of shaping a formable liquid composition during chemical reaction and foaming thereof until solidification. Still another object of the invention is to provide an improved method of shaping a mixture of chemical components which react to form a cellular polyurethane plastic. A still more specific object of the invention is to provide a method of shaping a formable liquid composition which, upon chemical reaction, produces a cellular polyurethane plastic into a product having a density which varies gradually from one side to the other. Still another object of the invention is to provide an improved process for making cellular polyurethane articles having a gradually increasing density from one surface thereof to another.

Other objects will become apparent from the following description with reference to the accompanying drawing in which FIGURE 1 is a diagrammatic longitudinal view of an apparatus suitable for carrying out the process of this invention and FIGURES 2 through 14 are cross-sections through embodiments having various shapes and sizes producable in accordance with this invention.

The foregoing objects as well as others are accomplished in accordance with this invention, generally speaking, by providing a method of mixing together the chemical components which react to form a cellular plastic, pouring the resulting mixture into a suitable shaping device, such as a mold, and rotating the mold while it contains the reaction liquid and until solidification of the resulting plastic. The mold or other shaping device may be rotated constantly while the liquid is being poured or it may not be rotated until after a sufficient amount of liquid has been introduced into the mold. It is essential, however, that the mold or other shaping device be rotated before any substantial amount of chemical reaction between the components of the liquid and before solidification of the liquid into a cellular plastic. The mold may be rotated at a constant speed to provide a product having a density which gradually increases from the center of the object to the external surface thereof or the speed of rotation may be varied during chemical reaction and solidification to form a product in which the density changes abruptly from one region of the article to the other. The invention is primarily concerned with the production of cellular polyurethane plastics, but it may also be practiced in molding cellular products from other reaction masses which, either through chemical reaction or by the introduction of a gas, solidify into a cellular plastic product.

The process provided by this invention provides for the formation of molded cellular plastic articles of various shapes. It is possible, for example, to form shells, half-shells, annular bodies, cylinders, curved plates, O-rings, partially or completely foamed articles having angular, wavy or oval external contours which have a variable cross-sectional density. The articles formed in accordance with this process have their greatest density along the outer edge where the peripheral speed of the mold is the greatest and thus have a reinforced skin on the surface thereof. These products, because of the gradually increasing density from the center to the external surface thereof may be subjected to sharper bends, higher compressive forces or tensile loads than products made by the heretofore available shaping processes in which the product has a substantially uniform density throughout its cross-section. Because of these improved physical characteristics, the articles made by this process may be relatively large in size of, say, for example, 12 to 15 meters or more in cross-section.

As pointed out hereinbefore, the method provided by this invention is suitable for making molded elements from any suitable foamable liquid composition which forms a solidified cellular plastic. It is most suitable, however, for making rigid, semi-rigid or elastic cellular plastics containing urethane groups. The polyurethane plastics which can be molded in accordance with this invention may be formed from any suitable foamable liquid composition, such as, for example, those disclosed in the aforesaid Hoppe et al. patent. The mixing of the organic compounnd having at least two reactive hyrogen atoms with the organic polyisocyanate, water and catalyst may be achieved by means of the process and apparatus disclosed in that patent and any of the compositions disclosed therein or elsewhere which will form a cellular polyurethane plastic may be used.

The organic compound having at least two reactive hydrogen atoms used to form a polyurethane may be, for example, an hydroxyl terminated polyester, a polyalkylene ether glycol, a polyesteramide, a polythioether glycol or the like. The organic polyisocyanate may be toluylene - 2,4 - diisocyanate, toluylene-2,6-diisocyanate, 1,5-naphthylene diisocyanate, phenylene diisocyanate, or the like. Suitable catalysts include the tertiary amines and any other suitable compound including those disclosed in the Hoppe et al. patent. Masked polyisocyanates may be used instead of the heretofore mentioned compounds, if desired.

A liquid blowable cold mixture of an acid hardened condensation product may also be used in practicing the invention and it is possible to subject the chemical reaction mass to elevated temperatures, if required, to bring about chemical reaction. Acetyl cellulose, polyvinyl chloride, silicone resins, polyester resins, polystyrene or polyethylene plastics or any other plastic material which can be mixed with a blowing gas while in the form of a viscous liquid are other examples of suitable materials useful in practicing the invention. With these types of materials, the blowing agent will be added while the material is in liquid form and polymerization or cross-linking is brought about during rotation and expansion of the liquid in the mold. In some instances, it may be necessary to cool the product before it is removed from the mold. According to one embodiment of the invention, blowable raw sheets of polyvinyl chloride, polyethylene acetyl cellulose, silicone rubber or polyurethanes are introduced into a mold and heated to about 150° C. to 200° C. to vulcanize, polymerize or cross-link the plastics during rotation. The resulting article may be cooled before it is removed from the mold.

In all the above-described possible uses of the rotational foaming process, there is effected a graduation of the density of the foam material, i.e., a high bulk density on the outside of the foam element and a low bulk density in the core thereof. The density can, for example, be 1.0 g./cc. on the outside and 0.01 g./cc. internally. Depending on the blowable medium to be introduced and the peripheral speed of the rotary device, it is possible to vary the density between 0.01–0.1 g./cc. or 0.1–0.3 g./cc. or 0.1–0.6 g./cc., etc. It is also possible to keep constant the density of the foam element produced by rotation if the speed of rotation is reduced as the reaction progresses, if necessary, to the value of zero. The maximum variation in density is possible more especially with reaction mixtures introduced in the liquid state.

The following are examples of reaction mixtures which can be used to produce foam materials which contain urethane groups and which are produced from liquid mixtures:

Example 1

Rigid foam with bulk density of about 300 kg./m.$^3$ when foamed freely is prepared from about 100 parts by volume of a polyester prepared from about 5 mols of adipic acid, 1 mol of phthalic anhydride and 8 mols of hexanetriol, about 45 parts by volume of toluylene diisocyanate, about 4 parts by volume of lithopone and about 1 part by volume of hexahydrodimethyl aniline.

By continuous rotation of this mixture in a mold during formation of a polyurethane, for example, at about 800 r.p.m., the bulk density can be varied between about 900 kg./m.$^3$ and about 400 kg./m.$^3$ (Temperatures of the mold, for example, may be about 20° C.–22° C.) Duration of rotation: about 10 minutes.

Example 2

Rigid foam with a bulk density when foamed freely of about 25 kg./m.$^3$ is prepared from about 90 parts by volume of a polyester prepared from about 3.75 mols of trimethylol propane, 0.25 mol of triethanolamine, 2.5 mols of adipic acid and 0.5 mol of phthalic anhydride, about 10 parts by volume of a polyester prepared from about 15 mols of adipic acid, 16 mols of diethylene glycol and 1 mol of trimethylol propane, about 30 parts by volume of trichloroethyl phosphate (fire-protection agent), about 80 parts by volume of toluylene diisocyanate, about 2 parts by volume of N-diethyl-β-phenoxyethyl amine, about 3 parts by volume of a sodium salt of a sulfonated castor oil with 54% water and about 1 part by volume of hexamethyl triethylene tetramine. With a constant peripheral speed (200 r.p.m.) during the rotation, the bulk density of the resulting product can, for example, be varied between about 400 and about 100 kg./m.$^3$, while if the peripheral speed is reduced constantly from 400 to 100 r.p.m, the bulk density can be varied from 800 kg./m.$^3$ (external) to 30 kg/m.$^3$ (internal). The temperature of the mold in this case can, for example, be in the region of 40° C. Duration of rotation: 5 minutes.

Example 3

Elastic foam material with a bulk density of about 45 kg./m.$^3$ when freely foamed is prepared from about 100 parts by volume of a polyester prepared from about 15 mols of adipic acid, 16 mols of diethylene glycol and 1 mol of trimethylol propane, about 42 parts by volume of toluylene diisocyanate, about 3 parts by volume of bis (diethylaminoethanol)-adipate, about 1 part by volume of diethyl amine oleate, about 1.5 parts by volume of a sodium salt of a sulfonated castor oil with about 54% water, and about 1 part by volume of water.

By continuous rotation, for example, at about 300 r.p.m., the bulk density can be varied between about 40 kg./m.$^3$ and about 80 kg./m.$^3$ The temperature of the mold in this case can, for example, be about 25° C.

Example 4

Elastic foam material with a bulk density of about 100 kg./m.$^3$ when freely foamed is prepared from about 100 parts by volume of a polyester prepared from about 1 mol of adipic acid and 1.1 mols of ethylene glycol, about 25 parts by volume of 1,4-para-phenylene diisocyanate forming mixture (A) mixed with resulting chain lengthening at about 130° C., about 1 part by volume of water and about 1 part by volume of hexahydrodimethyl aniline forming mixture (B) which is added at about 70° C. to the addition product produced from mixture (A).

By decreasing the speed of rotation from about 300 to about 50 r.p.m., it is possible to obtain a bulk density of about 350 kg./m.$^3$ (external) and about 200 kg./m.$^3$ (internal). Temperature during the rotation: about 70° C.

These examples of suitable reaction mixtures can be varied within wide limits. For example, by lowering or increasing the amounts of polyisocyanate and activator mixture, the bulk densities indicated in the examples can be increased or reduced, respectively. Moreover, by introducing the mixture into the mold in layers, it is possible to produce elements having concentric core layers, in which case the bulk densities change suddenly.

Cellular polyurethane plastic articles having concentric layers of cellular plastic of different composition and density may be formed in accordance with this invention by varying the speed of rotation of the mold during chemical reaction of the components and by pouring layers of different chemical composition into the mold. For example, a layer of foamable liquid composition which, upon chemical reaction, forms a rigid cellular polyurethane foam may be poured over a layer of liquid in the mold which, upon chemical reaction, forms an elastic cellular polyurethane foam. In this way, an article having a core of elastic foam and a covering of rigid foam is produced.

It has been established that the gradation of the bulk density of a product made from a blowable liquid mixture can be increased by varying the peripheral speed during the foaming of the mass, i.e., a high speed of rotation at the commencement of foaming, and a lower speed at the end of the foaming operation, or vice versa, whereby in the latter case elements having a small difference in cross-sectioned bulk density throughout are obtained, or elements which have a constant bulk density can be produced.

For the production of foam materials containing urethane groups, it is advantageous to use apparatuses, for example, movable mixing heads, which are particularly suitable for the manufacture of long tubes, half-shells, full shells and cylinders. The use of these apparatuses makes it possible, for example, to construct cylinders in such manner that the bulk density of the foam material not only decreases inwardly but by automatic modification of the composition of the reaction mixture, the bulk density is also graduated throughout the length of the shaped element, the rotating mold being moved away from the mixing head, which is mounted centrally of the rotary system.

Rod-shaped elements with a density decreasing progressively throughout the length of the element can be made in accordance with this invention. This is achieved by installing the molds to be filled (for example, for airscrew blades) radially in the rotary device and introducing the reaction mass from a position near the axis of the rotary device. Maximum consolidation at the tips of the rod-shaped element which are at the maximum distance from the axis of rotation is achieved in this way. As an example, the propeller root of a hollow propeller element, which root has to bear the maximum bending and torsional stresses can be formed by such a process.

The strength of shell-like or cylindrical elements produced by rotary casting can be strengthened by lining the mold with metal foils, rubber foils, plastic foils of any type, plywood, or fabrics of any type, or even with absorbent paper, before commencing the introduction of the foamable mixture. The foamable mixture, upon chemical reaction, becomes intimately bonded with the lining materials. The elements thus obtained can be used for high loads at right-angles or parallel to the surfacing layer. Layers of matted fleeces, metal, plastic or glass wool or the like provide an increase in the bulk density of the article in the marginal zones thereof.

In order to increase the supporting capacity of the molded element for loads in the direction of the longitudinal axis of the element, it is possible to line the rotary mold prior to foaming, for example, with rods or hollow elements consisting of metal, plastic or wood or with reeds or straw disposed longitudinally. These inserts are permeated completely by foam during the rotary process and lead to a substantial increase in the strength of the marginal zones of the molded body.

Hexagonal or oval elements can be made in accordance with this invention from foam materials containing urethane groups. If necessary, surfacing layers and materials which further strengthen the marginal zones can be included. Such materials form elements having a varying foamed wall thickness when the mold is not completely filled with foam.

The surfacing layers of the molded bodies may be light concrete shells or concrete shells reinforced with steel or molds into which the reactive mass is introduced with a density decreasing towards the core. For producing component shells with the same radius, for example, having the dimensions of a length of 6 meters and a width of 1 meter, a plurality of these surface layer constructions can be installed in a suitable rotary device. The rotary foaming process then takes place, whereby it is possible to produce an asymmetrical composite construction with a variation in density of the light-weight material support in the required thickness. This process is particularly suitable for the manufacture of components by the series production method. A supplementary surface treatment of the light-weight mixtures produced by rotation can also be used in this rotary device, such as a suitable spraying process for plastics or for metal deposition or other surface treatments.

When building up the core layer of light-weight materials, additional materials may be used which increase the strength of the light-weight materials; for example, simultaneously with the introduction of the blowable mixtures of foam materials, it is possible to work with a second supply device with which, if necessary using compressed air, fibrous fillers of all types, or sawdust or cement (inorganic or organic fillers) are blown into the mixture of foam material still present in liquid form in the rotary mold.

It is also possible to proceed in such manner that before the reaction mixture is introduced into the rotating mold, fillers of all types with a high bulk volume down to grain sizes of, for example, about 40 mm. diameter, are introduced. Such fillers can be wood shavings, short pieces of chopped straw or reeds or they can be scraps of foam material with a natural or synthetic base or fillers with a base of, for example, plastics or metals. The foamable reaction mixture poured or sprayed into the mold after the introduction of the fillers and consisting mainly of a base of polyurethane fills the cavities still existing between the fillers and completely permeates the fillers, so that it is possible to obtain a graduation in the bulk density in accordance with the invention.

In the production of dish-shaped elements, elements may be formed in such manner that dishes with a smaller radius of curvature than the rotary device are set up adjacent one another so that core layers of foam material having a variable density and thickness are formed in the foaming. This method is particularly suitable for the production of elements having equal stresses throughout the cross-section.

The process according to the invention is also suitable for the production of annular elements, for example, lifebelts, and for the complete or partial filling of vehicle tires with foam.

The process is also suitable for manufacturing composite elements which are lined on two sides, for example, double-walled tubes or dishes filled with light-weight materials. The procedure can be that after introducing the mixture of foam material and after the foam material has been expanded to the required thickness, the inner lining is introduced, which is forced by centrifugal force on to the still fresh foam material, and additional consolidation of the outermost marginal zones being obtained, if required, by increasing the peripheral speed. This process can also be carried out several times on the same structure, so that molded bodies with two to three layers of surfacing layer materials are obtained between which are disposed zones of foam material. When using this method, it is readily possible to obtain the following structure in a single working operation:

External surfacing layers of metal or hard foam material; core layer with layers of graduated bulk density, which are covered on the inside by another surfacing layer and are given a spray of elastic materials. Instead of using a movable mixing apparatus, it is also possible to introduce the blowable mixture introduced by spraying from a stationary device.

Completely closed spherical elements may be made in accordance with this invention. This may be done, for example, by placing glass fiber skins in a spherical supporting mold which is separably mounted in the rotary device and the necessary reaction mixture is introduced while the mold is still stationary. After closing the inlet opening, the rotary device is set in operation and also subjected to a supplementary rocking motion. By using this process, a spherical element is obtained which has a density decreasing from the surface towards the core.

In the drawing, FIGURE 1 is an illustration of a device for carrying the process into effect, while FIGURES 2–14 are diagrammatic sections through elements which can be produced with the apparatus according to FIGURE 1. The arrows in each case indicate the direction of rotation of the molds in which the elements are produced. In FIGURE 1, 1 represents the rotary mold, 2 the drive means for the mold, this drive means being mounted on a traveling unit 3. The mixing head is indicated at 4 and is provided with nozzle 5 and fixed on a supporting frame 6. The separate components are supplied from the controlled-feed apparatus 7 through the pipes 8 and 9 to the mixing head, preferably under pressure, and expelled as a reactive mixture through the nozzle 5 into the rotary mold 1. The unit 3 and thus the mold with the driving means 2, can be moved backwards and forwards while the mixing head is arranged in stationary manner. Using this apparatus, it is possible to produce elements the cross-sectioned density of which increases outwardly in a uniform or stepwise manner, since the mixture in the rotating mold is subjected to centrifugal force and is varied as regards its composition or the proportions of the components present in the mixture. The density of the element, in relation to its length, can furthermore increase progressively from right to left, since the mold can be displaced towards the right, while simultaneously the mixture is expelled from the nozzle 5. The composition and the proportions present in this mixture can also be varied.

Figure 2:
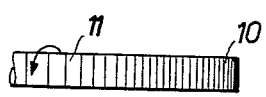

FIGURE 2 shows a longitudinal section of an element which is produced in the manner indicated. It can, for example, have a cross-sectional density variation from 0.9 to 0.2 g./cc. inwardly and a density of 0.2 g./cc. at the point indicated by the reference numeral 10 to 0.02 g./cc. at the point indicated by the reference numeral 11 in the direction of length.

Figure 3:
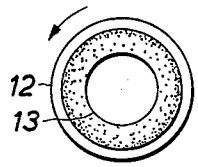

FIGURE 3 shows a cross-section through a foamable element which has a high density at the periphery 12 and a lower density at 13. The element is produced with a constant peripheral speed of the mold and a constant composition of the mixture.

Figure 4:
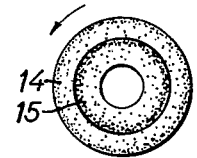

FIGURE 4 is a cross-section through a dish consisting of foam material and having two different layers, the outer layer 14 having, for example, a density variation from 0.9 to 0.6 g./cc. and the inner layer 15 a density variation from 0.3 to 0.05 g./cc.

The layer 14 can consist of a hard foam material while the layer 15 consists of an elastic foam, the layer 15 being introduced after complete cross-linking of the first layer, or the introduction of the second layer can take place immediately after casting the first layer, whereby very intimate bonding is assured and the transition from hard to elastic foam takes place gradually.

Figure 5:
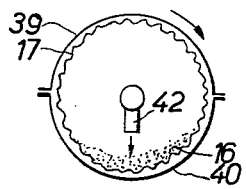

FIGURE 5 shows a cross-section through a foam material element, for the production of which a skin 17 of plastic or paper is laid on the inside of the mold which consists of the parts 39 and 40, before the mixture 16 is introduced through the fixed nozzle 42.

Figure 6:
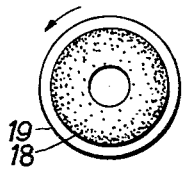

FIGURE 6 is a cross-sectional view of a foamed element with a layer 18 of different density and a surfacing layer 19.

Figure 7:
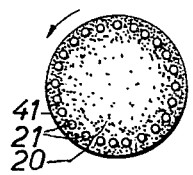

FIGURE 7 shows the cross-section of a foamed element which is produced by the rotary mold 41 being lined with rods 21 disposed longitudinally prior to the foaming operation and the reactive mixture then introduced into the mold, which leads to the production of the element 20 closely bonded to the rods 21.

Figure 8:
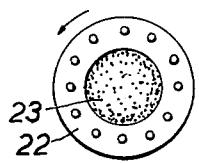

FIGURE 8 is a cross-sectional view of a reinforced concrete hollow element 22 filled with a foamed core 23 of variable density.

Figure 9A:
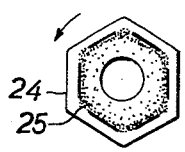
Figure 9B:
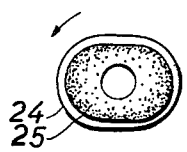
Figure 9C:
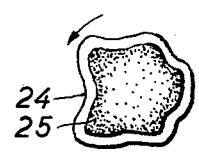

FIGURES 9a, 9b and 9c are cross-sections through rod-shaped elements of differing profiles, the surfacing layers 24 in each case being constructed as molds conforming to the required profile or contour, the mixtures being introduced into the molds so that foamed elements 25 of graduated density are formed.

Figure 10:
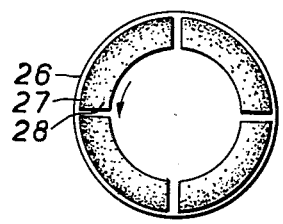

FIGURE 10 shows the cross-section through a rotary mold 26 in which are mounted surface layer elements 27 of the same size and consisting, for example, of light metal, into which are introduced light weight materials 28 of variable density by rotary casting.

Figure 11:
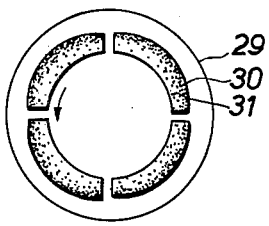

FIGURE 11 is a cross-section of a rotary mold 29, in which are arranged surface layer component shells 30 which have a smaller radius than the mold 29, so that core layers 31 of foam material of variable density and thickness are formed during the rotary foaming process.

Figure 12A:
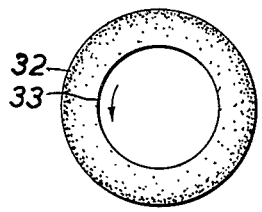
Figure 12B:
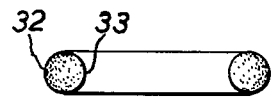

FIGURES 12a and 12b show an annular body which has a higher density on its outer periphery 32 than at its inner periphery 33.

Figure 13:
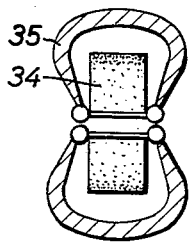

FIGURE 13 shows a section through a body of revolution 34 having varying density, which is produced in a rotary element 35.

Figure 14:
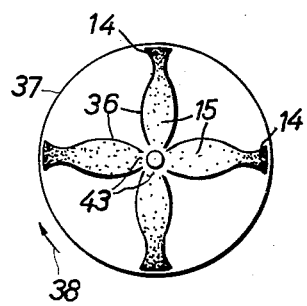

FIGURE 14 is a cross-section through a mold 37 for the manufacture of air-screw blades, in which the ends 14 of the propellers have a high density and the ends 15 at the propeller tip have a low density. The molds 36 for the blades are arranged in the rotary mold 37 which is rotated in the direction of the arrow 38. The mixture is supplied at 43 into the molds of the propeller blades 36.

In practicing the invention, any suitable foamable composition, such as one of the compositions described hereinbefore, is poured from nozzle 4 into mold 1 which is rotated until the components of the composition have reacted and a solidified cellular plastic is obtained.

Although the invention has been described in considerable detail in the foregoing for the purpose of illustration, it is to be understood that such detail is solely for this purpose and that variations can be made by those skilled in the art without departing from the spirit and scope of the invention except as is set forth in the claims. For example, any speed of rotation of the shaping device which produces a centrifugal force may be used, but preferably the device should be rotated at a speed of from about 1 revolution per minute to about 100 revolutions per minute. Likewise, any suitable organic compound having at least two reactive hydrogen atoms may be used, but preferably one having an hydroxyl number of from about 25 to about 400 should be used. The polyester used in preparing the polyurethane should preferably have an acid number between 0 and 2.

What is claimed is:

1. A method for shaping a cellular polyurethane plastic of a varying density which comprises pouring into a mold a foamable liquid composition which, upon chemical reaction, solidifies into a cellular polyurethane plastic, and rotating the mold at a speed which produces a centrifugal force until chemical reaction and solidification results.

2. A method for making a cellular polyurethane plastic having a gradually increasing density from core to external surface comprising pouring into a shaping device a liquid foamable mixture which, upon chemical reaction, produces a solidified cellular polyurethane plastic, and rotating the shaping device at a speed which produces a centrifugal force until chemical reaction and solidification of said liquid results.

3. A process for the production of shaped cellular plastics of varying density which comprises continually introducing several reaction components into a mixing chamber thereby causing the intimate mixing thereof, continually expelling the reaction mixture into a mold, rotating said mold at a speed of from 1 to 100 revolutions per minute, and varying the density of the resulting cellular product by varying the proportion of the components introduced into said mixing chamber.

4. Process according to claim 3, wherein a fibrous filler is blown into the reactive liquid mixture during the introduction of the latter.

5. Process according to claim 3, wherein a filler is introduced into the prepared mold before the introduction of the foamable reaction mixture and the cavities in the inserted filler are filled by the foam of the foamable reaction mixture which is subsequently introduced.

6. A method for shaping a cellular polyurethane plastic of a varying density which comprises lining a mold with a sheet of metal, pouring into said mold a foamable liquid composition which upon chemical reaction solidifies into a cellular polyurethane plastic and rotating the mold at a speed which produces a centrifugal force until chemical reaction and solidification results.

7. A method for making a cellular polyurethane plastic article having a concentric layer of cellular polyurethane plastic of one density and rigidity, and a second concentric layer of a cellular polyurethane plastic of another density and rigidity which comprises pouring into a rotating mold a foamable liquid reaction mixture which, upon chemical reaction, forms a cellular polyurethane plastic, pouring a second liquid foamable reaction mixture of different composition into said rotating mold on the first said layer and continually rotating the mold at a speed which produces a centrifugal force until the chemical reactions occur and two layers of different density solidify.

References Cited in the file of this patent

UNITED STATES PATENTS

| 1,840,027 | Fetter | Jan. 5, 1932 |
| 1,995,977 | Gonda | Mar. 26, 1935 |
| 2,349,549 | Hardman et al. | May 23, 1944 |
| 2,764,565 | Hoppe et al. | Sept. 25, 1956 |
| 2,839,788 | Dembiak | June 24, 1958 |

FOREIGN PATENTS

| 15,495 | Australia | July 2, 1929 |
| 749,541 | Great Britain | May 30, 1956 |

OTHER REFERENCES

Smith, A. W.: The Elements of Physics, 1948, McGraw-Hill Co. Inc., pp. 168–175.

Modern Plastics, "Polyurethane," November 1954, pp. 106–108, 214–216.